(12) United States Patent
    Demange

(10) Patent No.: US 10,059,177 B2
(45) Date of Patent: Aug. 28, 2018

(54) STRUCTURAL COMPONENT FOR MOTOR VEHICLE PART AND MOTOR VEHICLE PART INCLUDING THE COMPONENT

(71) Applicant: Compagnie Plastic Omnium, Lyons (FR)

(72) Inventor: Jean-Yves Demange, Amberieu en Bugey (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 15/039,443

(22) PCT Filed: Dec. 16, 2014

(86) PCT No.: PCT/EP2014/077912
    § 371 (c)(1),
    (2) Date: May 26, 2016

(87) PCT Pub. No.: WO2015/091448
    PCT Pub. Date: Jun. 25, 2015

(65) Prior Publication Data
    US 2017/0174055 A1    Jun. 22, 2017

(30) Foreign Application Priority Data
    Dec. 19, 2013  (CN) .................... 2013 2 0844961 U

(51) Int. Cl.
    *B60J 5/10*     (2006.01)
    *B60J 5/04*     (2006.01)
    (Continued)

(52) U.S. Cl.
    CPC .............. *B60J 5/107* (2013.01); *B60J 5/042* (2013.01); *B62D 25/12* (2013.01); *B62D 29/043* (2013.01)

(58) Field of Classification Search
    CPC ......... B60J 5/107; B60J 5/042; B62D 29/043; B62D 25/12
    (Continued)

(56) References Cited

U.S. PATENT DOCUMENTS

| | | | |
|---|---|---|---|
| 7,244,501 B2 * | 7/2007 | Raghavendran | .......... B32B 5/28 |
| | | | 428/412 |
| 2008/0066983 A1 | 3/2008 | Kimoto et al. | |

(Continued)

FOREIGN PATENT DOCUMENTS

| EP | 1714856 A1 | 10/2006 |
|---|---|---|
| EP | 1792807 A1 | 6/2007 |

(Continued)

OTHER PUBLICATIONS

International Search Report PCT/ISA/210 for International Application No. PCT/EP2014/077912 dated Apr. 14, 2015.

(Continued)

*Primary Examiner* — Joseph D. Pape
*Assistant Examiner* — Dana D Ivey
(74) *Attorney, Agent, or Firm* — Harness, Dickey & Pierce, P.L.C.

(57) ABSTRACT

The present invention relates to a structural component for motor vehicle closing part and a motor vehicle closing part including the component. The structural component includes a main body at least partially made of a first plastic and a strengthening portion with mechanical strength higher than that of the main body, characterized in that the strengthening portion is at least partially made of a second reinforced plastic and is integrally molded with the main body, and the mechanical strength of the second reinforced plastic is higher than that of the first plastic. With this structural component, the use of metal reinforcements can be reduced or even completely omitted, thereby achieving the purpose (Continued)

of reducing the weight of the closing part and hence saving cost.

10 Claims, 2 Drawing Sheets

(51) Int. Cl.
 *B62D 25/12* (2006.01)
 *B62D 29/04* (2006.01)
(58) Field of Classification Search
 USPC ..................................................... 296/146.6
 See application file for complete search history.

(56) References Cited

U.S. PATENT DOCUMENTS

| 2008/0185874 A1 | 8/2008 | Kimoto et al. |
| 2011/0298248 A1 | 12/2011 | Joly-Pottuz et al. |
| 2013/0313752 A1 | 11/2013 | Joly-Pottuz et al. |

FOREIGN PATENT DOCUMENTS

| EP | 2394887 A1 | 12/2011 |
| FR | 2932153 A1 | 12/2009 |
| JP | 2013056669 A | 3/2013 |

OTHER PUBLICATIONS

Written Opinion of the International Searching Authority PCT/ISA/237 for International Application No. PCT/EP2014/077912 dated Apr. 14, 2015.

\* cited by examiner

STRUCTURAL COMPONENT FOR MOTOR VEHICLE PART AND MOTOR VEHICLE PART INCLUDING THE COMPONENT

CROSS-REFERENCE TO RELATED APPLICATIONS

This application is the U.S. National Phase application of PCT Application No. PCT/EP2014/077912 filed on Dec. 16, 2014, which claims priority to Chinese Application No. 201320844961.1 filed on Dec. 19, 2013, the contents of each of which are incorporated herein by reference.

TECHNICAL FIELD

The present invention relates to a structural component for motor vehicle part, particularly closing part, and a motor vehicle part including the component.

BACKGROUND

In the field of automobile manufacturing, more and more components, including various structural components, are made of plastic materials in order to reduce the overall weight and thus save fuel. The so-called structural components refer to those components which provide required stiffness and strength for vehicle body and usually bear or support other components.

Although plastic materials are lighter than metals, their strengths are generally lower than those of metals. Therefore, plastic materials are usually used to manufacture the portions of structural components, which don't require high strength, while the areas under higher stress still need to be strengthened by metal parts.

For example, for structural components of motor vehicle parts, particularly closing parts (usually their inner panels), the areas under higher stress include the areas where hinges are mounted.

For tailgates which need to be supported by power assisting devices, the areas under higher stress also include columns on which hydraulic levels or air spring struts, etc. are installed. In prior art, these areas are usually strengthened by metal parts to meet the design requirements for stress.

However, metal parts are heavy and expensive, and their processing relates to such complicated processes of high cost as punching, overmolding which is necessary for binding the metal parts with plastic portions, etc.

SUMMARY OF THE INVENTION

The present invention aims at providing a structural component for motor vehicle closing part, which can reduce or even completely avoid the use of metal reinforcements so as to achieve the purpose of reducing the weight of closing part and saving cost.

Therefore, an object of the present invention is to provide a structural component for motor vehicle, which includes a main body at least partially made of a first plastic and a strengthening portion with mechanical strength higher than the main body, characterized in that the strengthening portion is at least partially made of a second reinforced plastic with mechanical strength higher than the first plastic, and is integrally molded with the main body.

"The so-called integral molding (French: venu de moulage)", means that the strengthening portion and the main body are molded at substantially same time in a single mould to directly form an integral component connected together, without needing other operations such as overmolding.

As such, since the strengthening portion employs the second reinforced plastic with higher strength, the dimension of metal reinforcements used can be accordingly reduced or such metal reinforcements can even be completely omitted, while still meeting the designed stress requirements for the strengthening portion. Therefore, the weight of motor vehicle can be reduced and thus the manufacturing cost can be lowered.

Preferably, the strengthening portion is completely made of the second reinforced plastic. In this way, metal reinforcements can be omitted completely, and thereby the purpose of reducing the weight of the closing part and saving the manufacturing cost can be achieved as fully as possible.

Of course, it can be contemplated that the strengthen portion is made of many different materials, the mechanical strengths of which are all higher than that of the first plastic.

Preferably, according to the present invention, both the first plastic and the second reinforced plastic of the structural component are thermoplastic, and the main body and the strengthening portion are formed by means of sequential injection molding. As such, the whole component can be formed once for all in a single molding cavity of a single mould to achieve the purpose of reducing the number of processes and saving cost.

More preferably, resin matrices of the first plastic and the second reinforced plastic are compatible with each other, preferably belong to the same family, more preferably are the same.

Accordingly, the formed structural component has no obvious interfaces at the joint of the main body and the strengthening portion, the bonding of two plastics is the best, there exist no strength weakening areas, and the best connecting effect can be realized for the structural component, which greatly improves the overall strength of the structural component. The resin matrix is preferably SMA, ABS/PC, polyamide or polypropylene.

Further, it can be contemplated that both the first plastic and the second reinforced plastic are thermosetting, for example SMC (Sheet Molding Compound) or BMC (Bulk Molding Compound), and the main body and the strengthening portion are formed by means of co-compression molding or by means of compression molding and injection molding carried out simultaneously or sequentially. Alternatively, the first plastic and the second reinforced plastic are thermosetting and thermoplastic respectively, or the first plastic and the second reinforced plastic are thermoplastic and thermosetting respectively, and the main body and the strengthening portion are co-formed by means of compression molding and injection molding carried out simultaneously or sequentially or by means of sequential injection molding.

Preferably, the first plastic contains reinforcing fibers, such as glass fibers, or talc, and the second reinforced plastic contains carbon fibers and/or glass fibers. The carbon fiber or glass fiber reinforced plastic has very high strength and can meet the designed stress requirements for the strengthening portion, even when it is solely used for making the latter.

It may also be contemplated that the main body and the strengthening portion are made of plastic containing the same kind of reinforced fibers, while the plastic used for forming the strengthening portion contains a higher proportion of reinforced fiber to meet the designed stress requirements for the strengthening portion.

It should be appreciated that the main body may be wholly made of non-reinforced plastic or be formed by portions made of reinforced plastic and portions made of non-reinforced plastic. It is especially suitable to make areas which withstand smaller stress and thus require lower strength with non-reinforced plastic. As such, the weight of closing part and thus its cost can be further lowered.

In one exemplary embodiment, the strengthening portion also includes portion(s) made of a plastic different from the second reinforced plastic, and the mechanical strength of the former is also higher than that of the first plastic.

The present invention also relates to a motor vehicle closing part which includes the above-mentioned structural component.

Preferably, the motor vehicle closing part is an engine hood, a trunk lid, a tailgate or a side door, and the structural component constitutes a panel of the closing part. Herein the so-called "panel" is preferably an inner panel which bears the weight of the closing part and supports other parts, but it can under some circumstances be an outer panel with the above functions, or it can be the only one when the closing part contains a single panel. Moreover, those skilled in the art are capable of determining according to different applications which portion(s) of the structural component is(are) strengthening portion. For example, when the structural component is a panel of the tailgate of a motor vehicle, the strengthening portion includes columns, an area where a trunklock is mounted, and areas where hinges are mounted, which hinges are used to mount the tailgate to a body-in-white.

The present invention further relates to a motor vehicle part which includes the above-mentioned structural component. The motor vehicle part may be, for example, an engine hood, a trunk lid, a side door, a tailgate, a front body panel, a floor and a roof arch of a motor vehicle, etc.

BRIEF DESCRIPTION OF THE DRAWINGS

The present invention can be better understood through description of the following non-limited exemplary embodiments in conjunction with the following drawings in which.

DETAILED EMBODIMENTS

Figure 1:
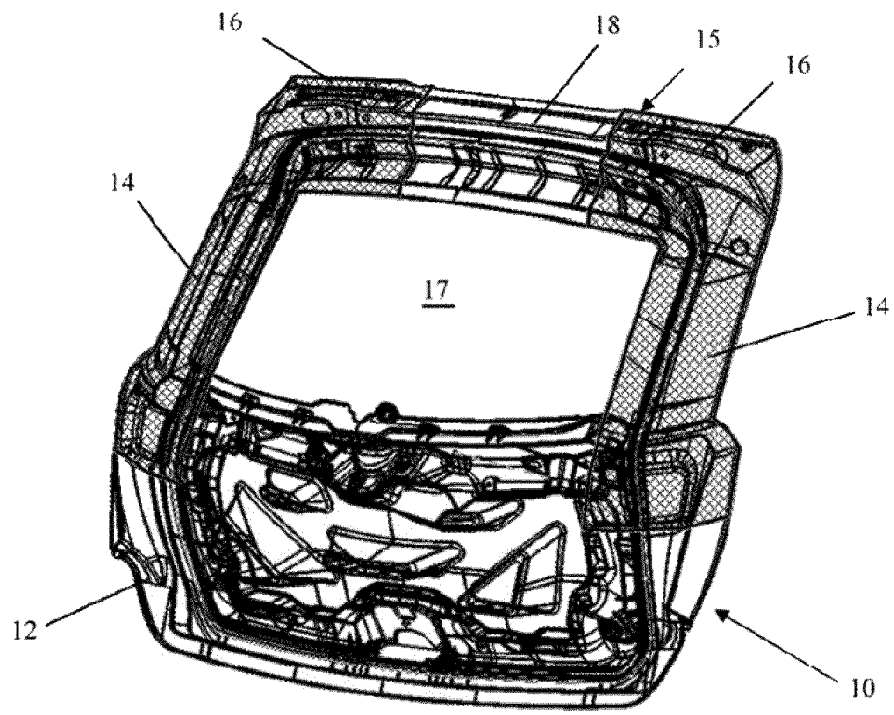
FIG. 1 is a perspective view of a structural component for motor vehicle closing part according to one embodiment of the present invention.

FIG. 1 shows a structural component according to a preferred embodiment of the present invention. In the embodiment, the structural component is an inner panel of a tailgate of a motor vehicle. The outside surface of the inner panel can be seen from FIG. 1, that is, the surface toward the outside of the motor vehicle.

The inner panel 10 of the tailgate includes an upper beam 15, two columns 14 and a lower portion 12, which together define an opening 17 for installing a rear window glass. The tailgate is installed to a body-in-white of a motor vehicle through hinges (not shown) mounted on both ends 16 of the upper beam 15, and gas springs or hydraulic rods (not shown) are respectively fixed on columns 14 in order to support the tailgate when it is opened.

In this example, the middle portion 18 of the upper beam 15 and the lower portion 12 of the inner panel 10 are made of glass fiber reinforced plastic and together constitute the so-called main body herein, while the columns 14 and two ends 16 of the upper beam 15 are made of carbon fiber reinforced plastic and together constitute the so-called strengthening portion herein, which are indicated by shading in each view of the drawings. The main body and the strengthening portion are formed by integral molding and more specifically are molded in a single mould through sequential bi-injection process. Therefore, the main body and the strengthening portion are connected to form a monolith in a way that the front ends of the two plastic flows intertwine and thus co-form with each other.

It should be understood that resin matrices of the plastics for making the main body and the strengthening portions are compatible with each other, preferably belong to the same family. In this example, the resin matrices of the reinforced plastics are the same and both are polyamide or polypropylene. It can also be SMA or ABS/PC. It may be contemplated that different kinds of resin matrix are employed. In addition, it may be contemplated that the main body and the strengthening portion can be manufactured using plastic with the same kind of reinforced fiber, while the plastic used for forming the strengthening portion contains a higher proportion of reinforced fiber in order to meet the designed stress requirements for the strengthening portion.

Moreover, it may also be contemplated that the strengthening portion is made of a variety of fiber reinforced plastics with for example different types and amounts of fibers, and their mechanical strengths are higher than that of the material used to manufacture the main body.

In another exemplary embodiment, both the first fiber reinforced plastic used to manufacture the main body and the second fiber reinforced plastic used to manufacture the strengthening portion are thermosetting (such as SMC, BMC and so on). In this case, the main body and the strengthening portion are formed through co-compression molding or by means of compression molding and injection molding carried out simultaneously or sequentially. In both cases, the main body and the strengthening portion are integrally molded.

In another exemplary embodiment, the first fiber reinforced plastic used to manufacture the main body and the second fiber reinforced plastic used to manufacture the strengthening portion are thermosetting and thermoplastic respectively, or they are thermoplastic and thermosetting respectively. In this case, the main body and the strengthening portion are co-formed through compression molding and injection molding carried out simultaneously or sequentially or by means of sequential injection molding. In both cases, the main body and the strengthening portion are integrally molded.

In the following it will described in combination with FIG. 2-FIG. 5 how to manufacture the structural component 10 of the present exemplary embodiment through sequential bi-injection molding.

Figure 2:
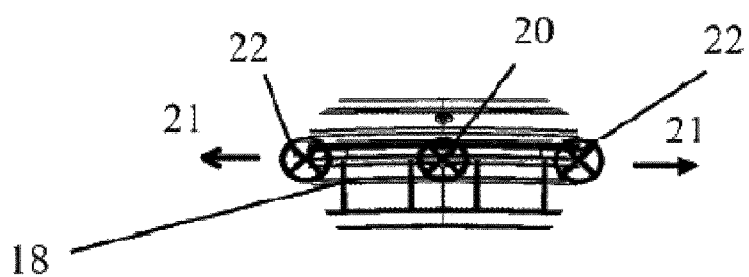
FIG. 2-FIG. 5 show different moments in the process of manufacturing the structural component as shown in FIG. 1 by means of sequential bi-injection molding.

Firstly, referring to FIG. 2, nozzle 20 injects glass fiber reinforced plastic into the mould, and the front ends of the plastic flow in the mould respectively to the left and right along the directions of arrows 21 in order to form the middle portion 18 of upper beam 15. Pressure sensors (not shown) are provided near the nozzles 22, by which the front ends of the plastic are detected to reach the nozzles 22 which are actuated based on the detection.

Figure 3:
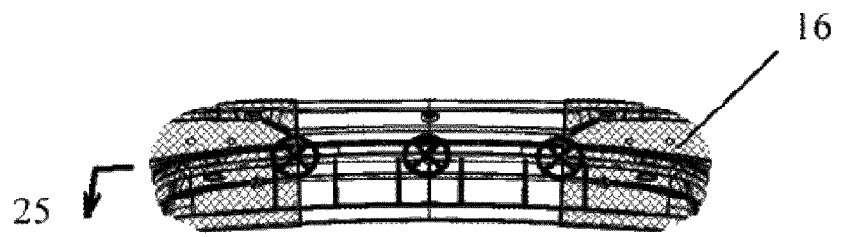

Then, referring to FIG. 3, nozzles 22 inject carbon fiber reinforced plastic into the mould respectively, and the front ends of the plastic flow in the mould along the directions of arrows 25 (two symmetrical arrows with the right one not being shown) in order to form two ends 16 of the upper beam 15. Pressure sensors (not shown) are provided near the nozzles 26, by which the front ends of the plastic are detected to reach the nozzles 26 which are actuated based on the detection.

Figure 4:
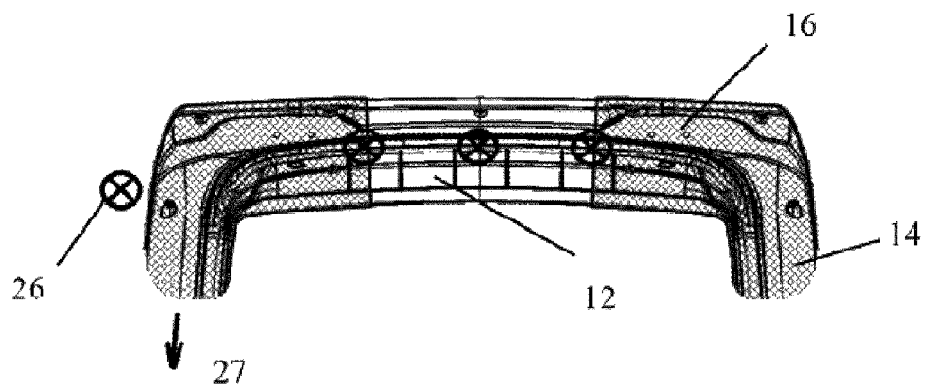
Figure 4:
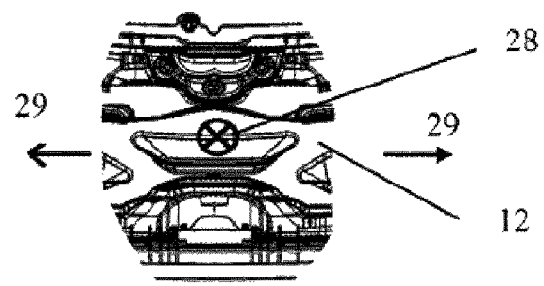

Next, referring to FIG. 4, nozzles 26 (two symmetrical nozzles with the right one not being shown) inject carbon fiber reinforced plastic into the mould respectively, and the front ends of the plastic flow in the mould along the directions of arrows 27 (two symmetrical arrows with the right one not being shown) in order to form columns 14 on both sides. Meanwhile, nozzle 28 is actuated to inject glass fiber reinforced plastic into the mould, and the front ends of the plastic flow in the mould along the directions of arrows 29 in order to form the lower portion 12 of the inner panel 10. Pressure sensors (not shown) are provided near nozzles 30 and nozzles 32 respectively, by which the front ends of the plastic are detected to reach these nozzles which are actuated accordingly.

Figure 5:
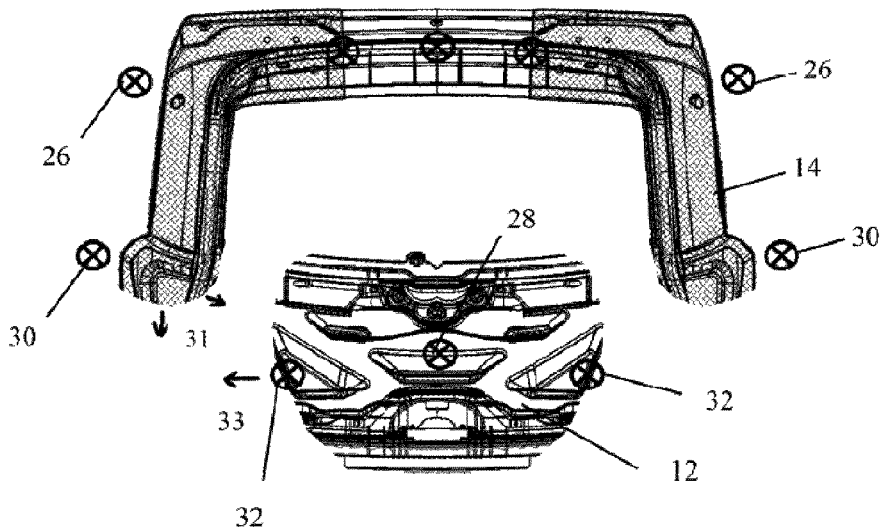

Finally, referring to FIG. 5, nozzles 30 inject carbon fiber reinforced plastic into the mould respectively, and the front ends of the plastic flow in the mould along the directions of arrows 31 (the symmetrical arrow at the right side is not shown) in order to continue forming columns 14; nozzles 32 inject glass fiber reinforced plastic into the mould respectively, and the front ends of the plastic flow in the mould along the directions of arrows 33 (two symmetrical arrows with the right one not being shown) in order to continue forming the lower portion 12. The inner panel 10 of the tailgate shown in FIG. 1 is obtained after the front ends of the carbon fiber reinforced plastic and the glass fiber reinforced plastic meet and intertwine with each other and are then subjected to such conventional molding steps as cooling.

Figure 6:
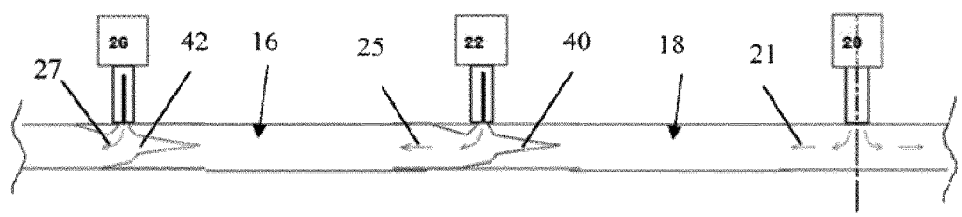
FIG. 6 schematically shows a section view of the structural component as shown in FIG. 1 manufactured by means of sequential bi-injection molding.

FIG. 6 schematically shows a section view of the structural components 10 manufactured through sequential bi-injection molding. As can be seen in FIG. 6, the glass fiber reinforced plastic injected via nozzle 20 moves forward to the left and right directions along the arrows 21, and nozzles 22 begin to inject carbon fiber reinforced plastic into the mould when the front ends of the plastic reach the vicinity of the nozzles 22. Since the flow channel on the right side of the nozzle 22 is filled with glass fiber reinforced plastic, the front ends of the carbon fiber reinforced plastic and the glass fiber reinforced plastic are intertwined with each other to form a robust joint 40. Thanks to the joint 40, the two kinds of materials can be fixedly connected through a single molding process without needing any other external connections. Meanwhile, the carbon fiber reinforced plastic injected via nozzle 22 moves forward to the left along the arrow 25. Similarly, its front end is intertwined with the front end of the material injected via next nozzle 26 to form a joint 42. In this way, the structural component 10 thus obtained will be a single block.

Thus, as can be understood, it is particularly advantageous to employ the glass fiber reinforced plastic and the carbon fiber reinforced plastic with resin matrices which are compatible with each other or belong to the same family, particularly are the same. As such, the resin matrices are almost integrated at the joints, while the reinforcing fibers form smooth transitions, so the bonding of the two kinds of plastics is the best, and the best fixation and the greatest strength can be achieved for the structural component 10.

In this example, the strengthening portion of the structural component 10 is completely made of carbon fiber reinforced plastic, the advantage of which is that the weight of the closing part can be reduced as much as possible. But it may also be contemplated that a part of the strengthening portion is still made of metal, for example, a metal insert may be placed in the corresponding position in the mould and then over-molded with a plastic part. Even with such an embodiment, since the strengthening portion employs the fiber reinforced plastic with higher mechanical strength, the size of the metal insert can be reduced accordingly, while the designed stress requirements can still be met. Therefore, the purpose of reducing the weight of the closing parts and saving fuel can still be achieved.

According to another exemplary embodiment of the present invention, the main body of the structural component also includes portion(s) made of non-reinforced plastic, which is especially suitable for the areas withstanding low stress and thus requiring lower strength. The portion(s) may also be placed in the mould as insert(s) and then over-molded to form the main body.

According to yet another exemplary embodiment of the present invention, the main body of the structural component is wholly made of non-reinforced plastic.

It should be understood that according to the present invention, the material for making the strengthening portion(s) may be plastic reinforced by other fibers, such as glass fibers, or by fillers other than fibers, depending on the specific applications.

Of course, the present invention is not limited to the embodiments presented in the foregoing detailed description. Structural components for any closing parts (engine hood, side door, trunk door) may include strengthen portions made of fiber reinforced plastic with higher strength.

The drawings and the above description describe the non-limited exemplary embodiments of the present invention. In order to teach the principles of the innovation, some conventional aspects have been simplified or omitted. Those skilled in the art should understand that variations derived from these exemplary embodiments will fall within the scope of the present invention.

Those skilled in the art should understand that the above features can be combined in a variety of ways to form variations of the present invention. Therefore, the present invention is not limited to the above exemplary embodiments, but only defined by the claims and their equivalents.

The invention claimed is:

1. A structural component for a motor vehicle closing part comprising:
   a main body at least partially made of a first plastic; and
   a strengthening portion with a mechanical strength higher than a mechanical strength of the main body,
   wherein the strengthening portion is at least partially made of a second reinforced plastic and is integrally molded with the main body, and the mechanical strength of the second reinforced plastic is higher than that of the first plastic; and
   wherein the closing part is a tailgate, and the strengthening portion of the structural component includes columns, an area where a trunklock is mounted, and areas where hinges are mounted, the hinges being used to mount the tailgate to a body-in-white.

2. The structural component according to claim 1, wherein the strengthening portion is completely made of the second reinforced plastic.

3. A motor vehicle part comprising the structural component as defined in claim 2.

4. The motor vehicle part according to claim 3 being one of the following: an engine hood, a trunk lid, a side door, a tailgate, a front body panel, a floor and a roof arch of a motor vehicle.

5. The structural component according to claim 1, wherein both the first plastic and the second reinforced plastic are thermoplastic, and the main body and the strengthening portion are formed by means of sequential injection molding, resin matrices of the first plastic and the second reinforced plastic are compatible with each other, and belong to the same family, and includes at least one of SMA, ABS/PC, polyamide or polypropylene.

6. The structural component according to claim 1, wherein both the first plastic and the second reinforced plastic are thermosetting, and the main body and the strengthening portion are formed by means of co-compression molding or by means of compression molding and injection molding carried out simultaneously or sequentially.

7. The structural component according to claim 1, wherein the first plastic and the second reinforced plastic are thermosetting and thermoplastic respectively, or the first plastic and the second reinforced plastic are thermoplastic and thermosetting respectively, and the main body and the strengthening portion are co-formed by means of compression molding and injection molding carried out simultaneously or sequentially or by means of sequential injection molding.

8. The structural component according to claim 1, wherein the first plastic contains reinforcing fibers, such as glass fibers, or talc, and the second reinforced plastic contains carbon fibers and/or glass fibers.

9. The structural component according to claim 1, wherein the strengthening portion further includes portion(s) made of plastic different from the second reinforced plastic, the mechanical strength of which plastic is higher than that of the first plastic.

10. The motor vehicle closing part according to claim 1, wherein the closing part is an engine hood, a trunk lid or a side door, and the structural component constitutes a panel of the closing part.

* * * * *